(12) United States Patent
Zheng (10) Patent No.: US 12,379,324 B1
(45) Date of Patent: Aug. 5, 2025

(54) DEFECT INSPECTION SYSTEM

(71) Applicant: AUO Corporation, Hsinchu (TW)

(72) Inventor: Jing-Hong Zheng, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/671,915

(22) Filed: May 22, 2024

(30) Foreign Application Priority Data

Mar. 8, 2024 (TW) ................................ 113108511

(51) Int. Cl.
*G01N 21/88* (2006.01)
*G06T 7/00* (2017.01)
*H04N 23/10* (2023.01)
*G01N 21/95* (2006.01)

(52) U.S. Cl.
CPC ....... *G01N 21/8851* (2013.01); *G06T 7/0002* (2013.01); *H04N 23/125* (2023.01); *G01N 2021/8854* (2013.01); *G01N 2021/8887* (2013.01); *G01N 2021/9513* (2013.01); *G06T 2207/10024* (2013.01)

(58) Field of Classification Search
CPC .......................... G01N 21/8851; H04N 23/125
See application file for complete search history.

(56) References Cited

U.S. PATENT DOCUMENTS

| 5,793,221 | A | 8/1998 | Aoki | |
|---|---|---|---|---|
| 8,908,170 | B2 * | 12/2014 | Lin | G01N 21/8806 382/145 |
| 9,470,636 | B2 * | 10/2016 | Yang | G02F 1/133 |
| 10,242,635 | B2 * | 3/2019 | Nakaya | G09G 3/3648 |
| 10,891,725 | B2 | 1/2021 | Kigawa | |
| 11,756,493 | B2 * | 9/2023 | Lee | G09G 3/36 345/204 |
| 11,869,452 | B2 * | 1/2024 | Goto | G09G 3/3426 |
| 11,906,441 | B2 * | 2/2024 | Higa | G01N 21/8851 |
| 12,073,803 | B2 * | 8/2024 | Nakamura | G09G 3/3607 |
| 2012/0092385 | A1 * | 4/2012 | Ikeno | G09G 3/3611 345/88 |
| 2012/0129419 | A1 * | 5/2012 | Yoshimoto | G02F 1/136259 345/694 |

FOREIGN PATENT DOCUMENTS

| CN | 103076344 | 5/2013 |
|---|---|---|
| CN | 112798613 | 8/2021 |
| CN | 113284147 | 9/2021 |
| CN | 108090890 | 6/2023 |
| JP | 2007192613 | 8/2007 |

* cited by examiner

*Primary Examiner* — Irfan Habib
(74) *Attorney, Agent, or Firm* — JCIPRNET (57) ABSTRACT

A defect inspection system including an imaging unit and an analysis unit is provided. The imaging unit is adapted to capture a plurality of monochrome images of at least one gray level image of a display panel through a plurality of filters. Filter colors of the filters differ from each other. The analysis unit is adapted to determine a type of defect of the display panel in an abnormal area according to a brightness ratio or a brightness change rate between two gray levels of two of the monochrome images corresponding to the abnormal area of the display panel.

9 Claims, 9 Drawing Sheets

DEFECT INSPECTION SYSTEM

CROSS-REFERENCE TO RELATED APPLICATION

This application claims the priority benefit of Taiwan application serial no. 113108511, filed on Mar. 8, 2024. The entirety of the above-mentioned patent application is hereby incorporated by reference herein and made a part of this specification.

BACKGROUND

Technical Field

The disclosure relates to an inspection system, and particularly relates to a defect inspection system.

Description of Related Art

Most of current automatic optical inspection (AOI) systems determine whether an object to be inspected has defects by judging whether an optical measurement value of the object to be inspected in a captured image meets preset parameter conditions. Where, an automatic optical inspection system for in-panel defects (such as cell particles) is proposed. Since characteristic values of dust on the panel and defects in the panel are similar in optical inspection, it is easy to cause misjudgement of this type of automatic optical inspection system. If the parameters of the inspection are set more strictly, a number of false detections will increase. Otherwise, it easily leads to missed inspection of defects, which will require more manpower for subsequent re-judgment and affect production efficiency. In addition, this type of automatic optical inspection system used to inspect defects of the display panel cannot effectively detect color defects with similar gray levels.

SUMMARY

The disclosure is directed to a defect inspection system, which has high accuracy for recognizing different types of defects.

The disclosure provides a defect inspection system including an imaging unit and an analysis unit. The imaging unit is adapted to capture a plurality of monochrome images of at least one gray level image of a display panel through a plurality of filters. Filter colors of the filters differ from each other. The analysis unit is adapted to determine a type of defect of the display panel in an abnormal area according to a brightness ratio or a brightness change rate between two gray levels of two of the monochrome images corresponding to the abnormal area of the display panel.

Based on the above description, in the defect inspection system according to an embodiment of the disclosure, the analysis unit determines the type of defect of the display panel in the abnormal area according to the brightness ratio or the brightness change rate between two gray levels of two of the monochrome images in the plurality of monochrome images captured by the imaging unit corresponding to the abnormal area of the display panel. Since the imaging unit captures these monochrome images of the display panel operating in at least one gray level image through multiple filters of different filter colors, recognition rate of the defect inspection system on different types of defects is greatly improved.

DESCRIPTION OF THE EMBODIMENTS

The terms "about", "approximately", "essentially", or "substantially" used herein include the related value and an average within an acceptable deviation range for a specific value determined by those skilled in the art, considering a discussed measurement and a specific number of errors related to the measurement (i.e., a limitation of a measuring system). For example, "about" may represent a range within one or a plurality of standard deviations of the related value, or within ±30%, ±20%, ±15%, ±10%, ±5%. In addition, an acceptable deviation range or standard deviation may be selected for the terms "about", "approximately", "essentially", or "substantially" used in the specification based on measurement properties, cutting properties, or other properties without using one standard deviation for all properties.

In the drawings, the thickness of layers, films, panels, regions, etc., are exaggerated for clarity's sake. It will be understood that when a component such as a layer, a film, a region, or a substrate is referred to be "on" or "connected to" another component, it may be directly on or connected to the another component, or intermediate components may also exist there between. Comparatively, when a component is referred to be "directly on" or "directly connected" to another, none other intermediate component exits there between. As used herein, the "connection" may refer to physical and/or electrical connection. Furthermore, "electrical connection" of two components may refer to that other components may exist between the two components.

Moreover, relative terms such as "under" or "bottom" and "above" or "top" may be used for describing a relationship of one element and another element as that shown in figures. It should be noted that the relative terms are intended to include a different orientation of the device besides the orientation shown in the figure. For example, if a device in a figure is flipped over, the element originally described to be located "under" another element is oriented to be located "above" the another element. Therefore, the illustrative term "under" may include orientations of "under" and "on", which is determined by the specific orientation of the figure. Similarly, if a device in a figure is flipped over, the element originally described to be located "below" or "underneath" the another element is oriented to be located "on" the another element. Therefore, the illustrative term "under" or "below" may include orientations of "above" and "under".

The exemplary embodiment is described below with reference of a cross-sectional view of a schematic diagram of an idealized embodiment. Therefore, a shape change of the figure serving as a result of manufacturing techniques and/or tolerances may be expected. Therefore, the embodiment of the disclosure should not be construed as limited to a particular shape of a region as shown herein, but includes a shape deviation caused by manufacturing tolerance. For example, a shown or described flat area may generally have rough and/or non-linear features. Moreover, a shown acute angle may be round. Therefore, a region shown in the figure is essentially schematic, and a shape thereof is not intended to show an accurate shape of the region, and is not intended to limit a range of the claims of the disclosure.

Reference will now be made in detail to the exemplary embodiments of the present disclosure, examples of which are illustrated in the accompanying drawings. Whenever possible, the same reference numbers are used in the drawings and descriptions to refer to the same or similar parts.

Figure 1:
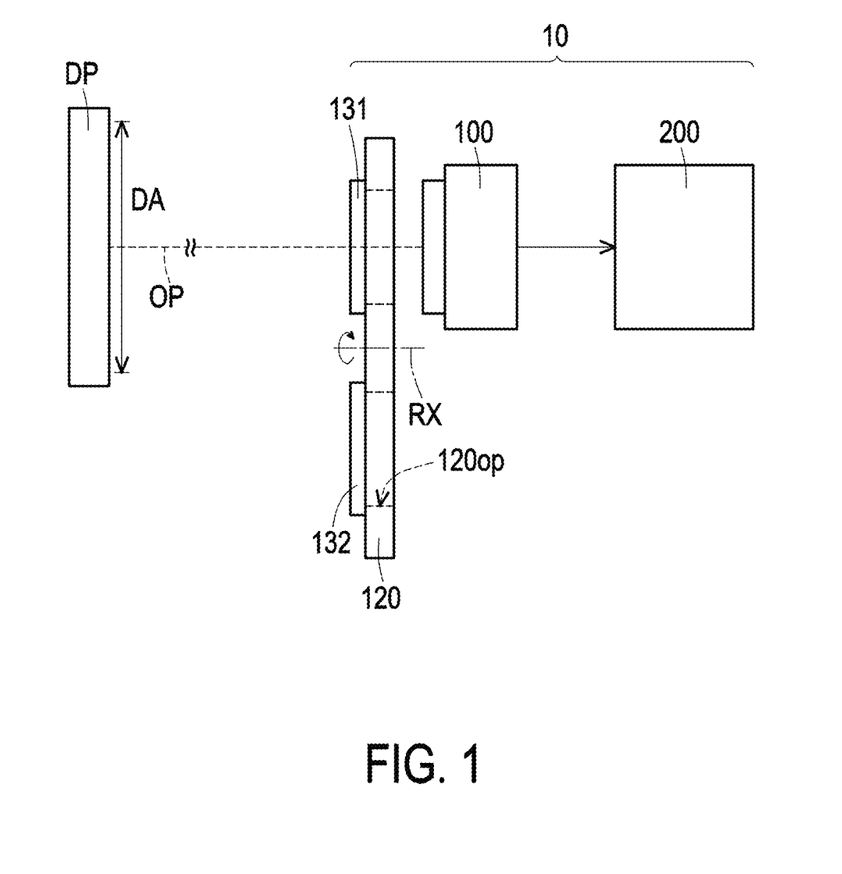
FIG. 1 is a schematic side view of a defect inspection system according to an embodiment of the disclosure.
Figure 2:
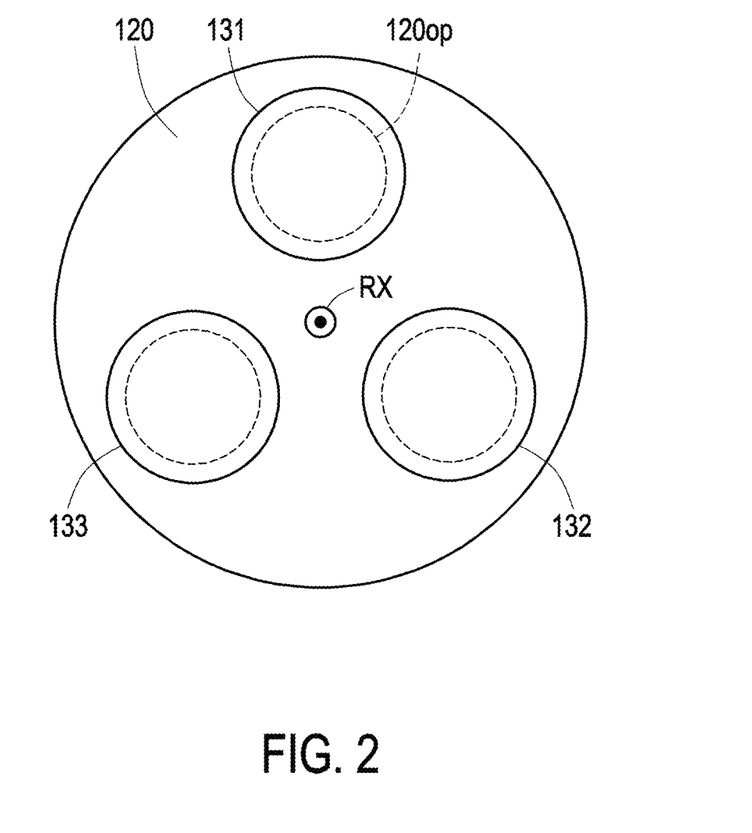
FIG. 2 is a schematic front view of a plurality of filters of FIG. 1 arranged on a switching mechanism.
Figure 3:
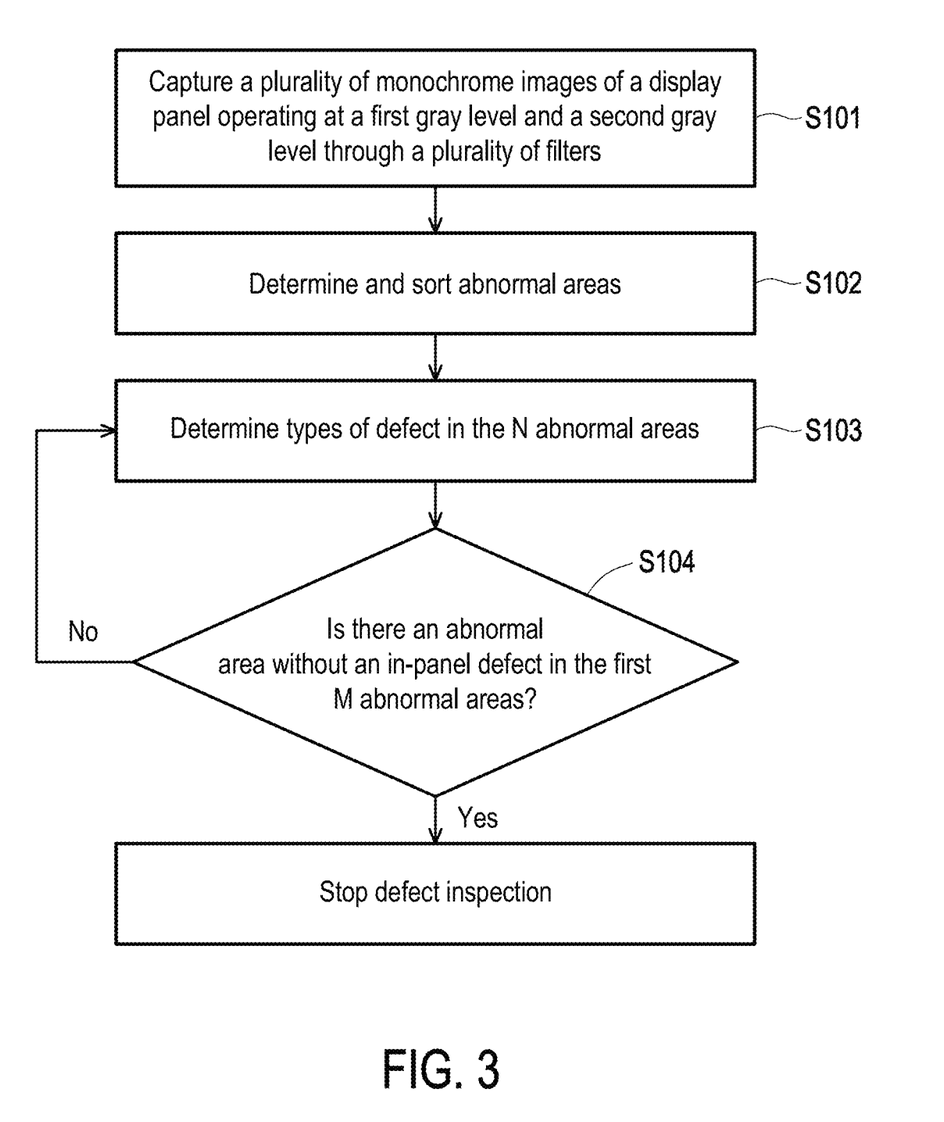
FIG. 3 is a schematic flowchart of the defect inspection system in FIG. 1 performing in-panel defect inspection on a display panel.
Figure 4:
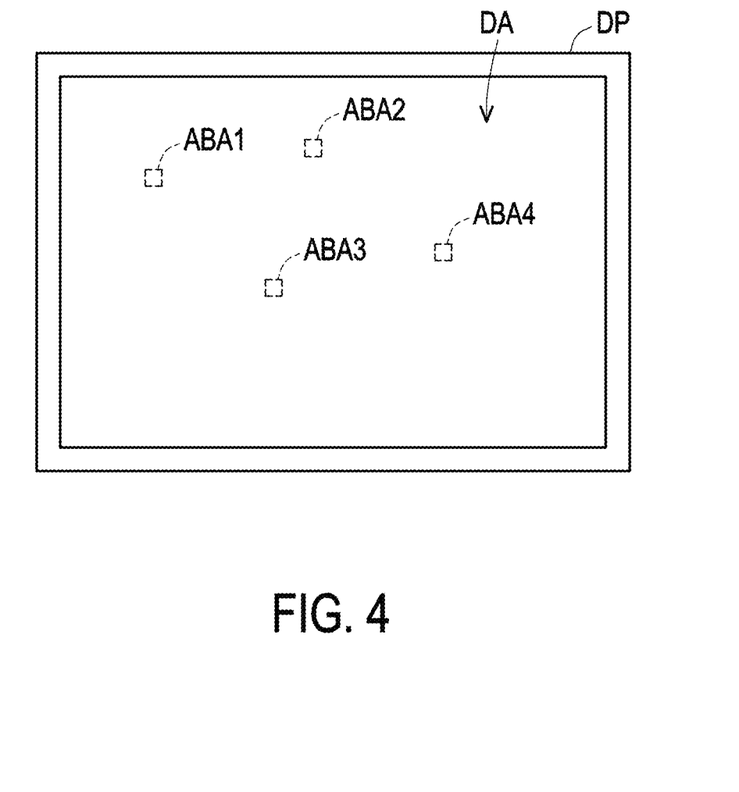
FIG. 4 is a schematic front view of the display panel of FIG. 1 on a side of the defect inspection system.
Figure 5:
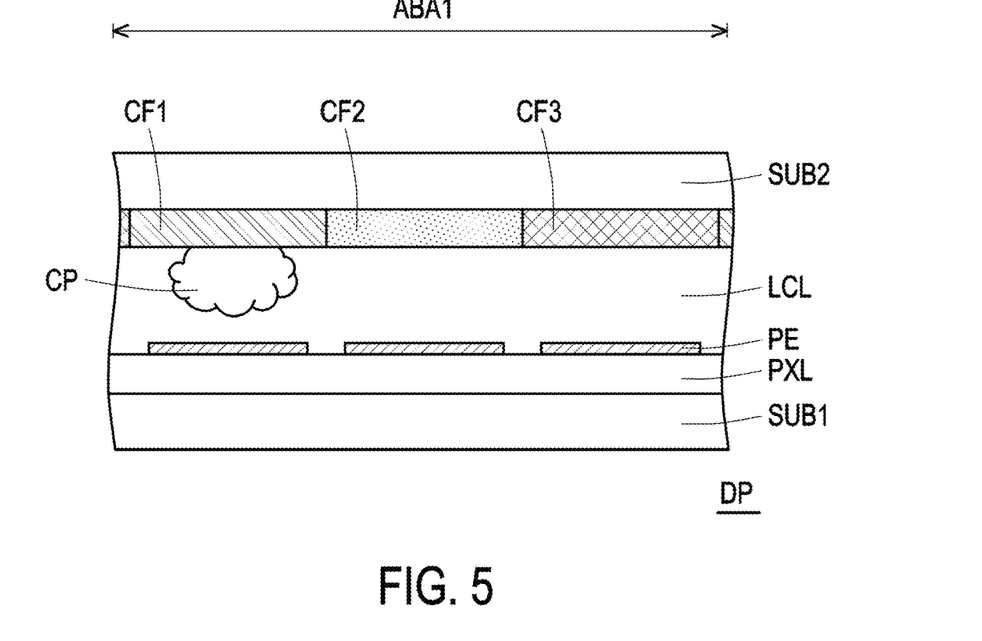
FIG. 5 is a schematic cross-sectional view of the display panel of FIG. 4 in an abnormal area.
Figure 6:
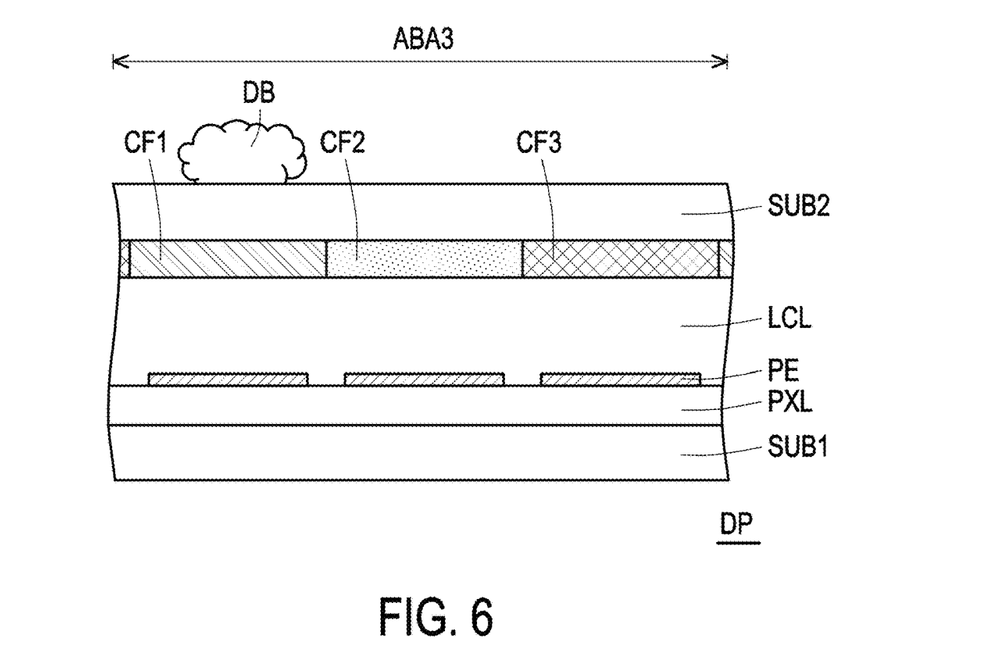
FIG. 6 is a schematic cross-sectional view of the display panel of FIG. 4 in another abnormal area.
Figure 7:
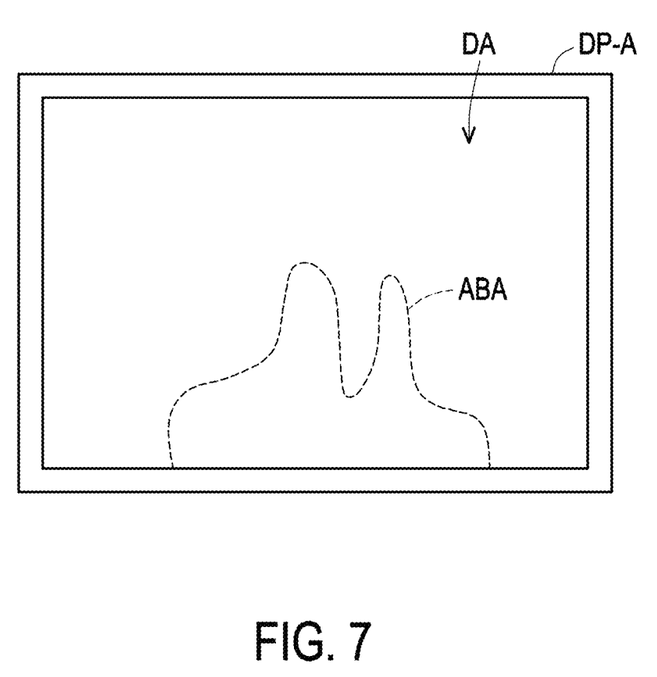
FIG. 7 is a schematic front view of another display panel.
Figure 8:
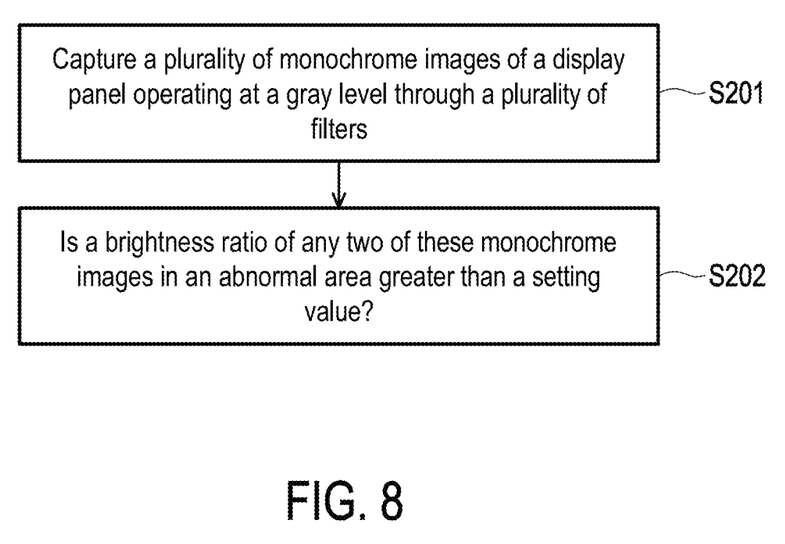
FIG. 8 is a schematic flowchart of the defect inspection system of FIG. 1 performing color defect inspection on another display panel.

FIG. 1 is a schematic side view of a defect inspection system according to an embodiment of the disclosure. FIG. 2 is a schematic front view of a plurality of filters of FIG. 1 arranged on a switching mechanism. FIG. 3 is a schematic flowchart of the defect inspection system in FIG. 1 performing in-panel defect inspection on a display panel. FIG. 4 is a schematic front view of the display panel of FIG. 1 on the side of the defect inspection system. FIG. 5 is a schematic cross-sectional view of the display panel of FIG. 4 in an abnormal area. FIG. 6 is a schematic cross-sectional view of the display panel of FIG. 4 in another abnormal area. FIG. 7 is a schematic front view of another display panel. FIG. 8 is a schematic flowchart of the defect inspection system of FIG. 1 performing color defect inspection on another display panel.

Referring to FIG. 1 and FIG. 2, a defect inspection system 10 may be used to inspect at least one defect of a display panel DP, and includes an imaging unit 100. The imaging unit 100 is adapted to capture a plurality of monochrome images of a display area DA of the display panel DP through a plurality of filters. The imaging unit 100 includes, for example, an image sensor made of a charge coupled diode (CCD) or a complementary metal-oxide semiconductor (CMOS), but the disclosure is not limited thereto.

In the embodiment, a number of the filters provided in the defect inspection system 10 may be three, which are respectively a filter 131, a filter 132 and a filter 133, but the disclosure is not limited thereto. In other embodiments, the number of the filters may be adjusted according to actual needs. Filter colors of these filters differ from each other. For example, in the embodiment, the filter colors of the filter 131, the filter 132 and the filter 133 may be red, green and blue respectively. These filters may be disposed on a switching mechanism 120. The switching mechanism 120 is, for example, a turntable, but the disclosure is not limited thereto.

In detail, the switching mechanism 120 may be provided with a plurality of openings 120op, and these filters are respectively arranged corresponding to the openings 120op. The imaging unit 100 may receive light (not shown) from the display panel DP through the plurality of filters arranged in overlap with the openings 120op respectively. After the imaging unit 100 captures one or a plurality of monochrome images of one color (for example, red), the turntable serving as the switching mechanism 120 may rotate clockwise or counterclockwise along a rotation axis RX, so that the filter 131 located on an imaging optical path OP of the imaging unit 100 is switched to the filter 132 or the filter 133 to capture a monochrome image of a next color.

The defect inspection system 10 further includes an analysis unit 200, which is electrically coupled to the imaging unit 100, and is adapted to determine a type of defect of the display panel DP in an abnormal area according to a brightness ratio or a brightness change rate between two gray levels of two of the monochrome images corresponding to the abnormal area of the display panel. In the embodiment, the analysis unit 200 includes, for example, a logic circuit or chip capable of performing functions such as image processing, numerical operations, or Boolean operations, but the disclosure is not limited thereto.

A process of inspecting in-panel defects (for example, cell particles) on the display panel DP by the defect inspection system 10 will be exemplarily described below.

Referring to FIG. 1 and FIG. 3, first, a plurality of monochrome images of the display panel DP operating at a first gray level and a second gray level are captured through a plurality of filters (step S101). A level of the second gray level is higher than a level of the first gray level. For example, in the embodiment, the imaging unit 100 may first capture two monochrome (for example, red) images of the display panel DP operating at the first gray level and the second gray level through the filter 131. Then, the switching mechanism 120 switches the filter 132 to the imaging optical path OP of the imaging unit 100, and the imaging unit 100 captures two other monochrome (for example, green) images of the display panel DP operating under the first gray level and the second gray level through the filter 132. Finally, the switching mechanism 120 switches the filter 133 to the imaging optical path OP of the imaging unit 100, and the imaging unit 100 captures two other monochrome (for example, blue) images of the display panel DP operating under the first gray level and the second gray level through the filter 133.

However, the disclosure is not limited thereto. In other modified embodiments, a capturing order of the monochrome images of different colors may be adjusted according to actual needs. In addition, the imaging unit 100 may also first capture three monochrome images of three colors of the display panel DP operating at the first gray level, and then capture additional three monochrome images of three colors of the display panel DP operating at the second gray level.

For example, the display panel DP may have 256 display gray levels, and these display gray levels are respectively arranged from L0 gray level to L255 gray levels from small to large according to their respective display brightness. In the embodiment, the first gray level is the L0 gray level, and the second gray level is, for example, the L3 gray level, but the disclosure is not limited thereto. In other embodiments, the second gray level may also be the L15 gray level or the L30 gray level.

In the embodiment, when the display panel DP operates at the L0 gray level, the imaging unit 100 may capture a first red image, a first green image and a first blue image of the display panel DP through the filter 131, the filter 132 and the filter 133 respectively. When the display panel DP operates at the L3 gray level, the imaging unit 100 may capture a second red image, a second green image and a second blue image of the display panel DP through the filter 131, the filter 132 and the filter 133 respectively.

After completing the capture of a plurality of monochrome images, the abnormal areas are determined and sorted (step S102). In the embodiment, the analysis unit 200 determines the abnormal area based on three monochrome images of different colors of the display panel DP operating at the L0 gray level that are captured by the imaging unit 100. For example, the analysis unit 200 may first determine the abnormal area on the first red image. When a brightness (or gray level) of the first red image corresponding to a local area of the display panel DP is greater than a setting value, the local area is determined to be the abnormal area.

Based on such judgment logic, the analysis unit 200 may determine N abnormal areas of the display panel DP from brightness analysis of the segmented areas of the first red image. Then, an inspection order of these abnormal areas may be arranged from large to small according to a magnitude relationship of a plurality of brightnesses respectively corresponding to these abnormal areas in the first red image. For example, the first four of the sorted N abnormal areas are sequentially a first abnormal area ABA1, a second abnormal area ABA2, a third abnormal area ABA3 and a fourth abnormal area ABA4 (as shown in FIG. 4).

After the inspection order of the N abnormal areas is arranged, types of defect in the N abnormal areas are determined (step S103). Specifically, the analysis unit 200 may first perform a first round of defect type determination on the first M of the sorted N abnormal areas, where M is smaller than N. Namely, the analysis unit 200 may first sequentially determine the types of defect from the first abnormal area to the M-th abnormal area. In the embodiment, selection of the M abnormal areas may be determined based on whether a brightness ratio corresponding to each abnormal area in the first red image and the first blue image captured by the display panel DP operating at the L0 gray level is greater than a first setting value. In the embodiment, M is, for example, 3, but the disclosure is not limited thereto.

In the embodiment, a defect determination step for each of the M abnormal areas may include two stages. First, the analysis unit 200 compares whether a brightness change rate of the corresponding abnormal area in the first red image and the second red image is within a first numerical range, and the first numerical range is, for example, ±X %, where X is, for example, 1, but the disclosure is not limited thereto. A value of X may be adjusted according to a model type of the display panel DP being tested. If yes, a second stage of comparison is performed. If not, the second stage of comparison will not be performed, and the abnormal area in the analysis (such as the third abnormal area ABA3 in FIG. 6) will be judged as not having an in-panel defect, but having other types of defects.

For example, the first red image (i.e., the first monochrome image) and the second red image (i.e., the second monochrome image) respectively have brightness T1 and brightness T2 corresponding to the abnormal area under analysis, and the aforementioned brightness change rate may be defined by the following expression:

$$\left(\frac{T2-T1}{T1}\right)\%.$$

In the second stage of analysis, the analysis unit 200 may further compare whether the brightness corresponding to the abnormal area under analysis in the first red image is within a second numerical range, and the second numerical range is, for example, A±Y %, where A is the maximum brightness value corresponding to the aforementioned M abnormal areas in the first red image, and Y is, for example, 3, but the disclosure is not limited thereto. The value of Y may be adjusted according to the model type of the display panel DP being tested. If yes, the abnormal area under analysis (such as the first abnormal area ABA1 in FIG. 5) is determined to have an in-panel defect (such as cell particle).

Referring to FIG. 5, in the embodiment, the display panel DP to be detected is, for example, a liquid crystal display panel, which may include a substrate SUB1, a substrate SUB2, a pixel array layer PXL, a plurality of color filter patterns CF1-CF3, a plurality of pixel electrodes PE and a liquid crystal layer LCL. The liquid crystal layer LCL is disposed between the substrate SUB1 and the substrate SUB2. The pixel array layer PXL is disposed on the substrate SUB1. The plurality of pixel electrodes PE are disposed on the pixel array layer PXL, and are electrically connected to a plurality of active devices (not shown) in the pixel array layer PXL respectively. The substrate SUB2 is provided with the color filter pattern CF1, the color filter patterns CF2 and the color filter patterns CF3 arranged in an array.

For example, in defect determination results of the first M abnormal areas, the defect existing in the first abnormal area ABA1 is determined to be an in-panel defect. Namely, the defect is caused by a foreign matter CP existing between the substrate SUB1 and the substrate SUB2 and overlapping the color filter pattern CF1. In the embodiment, filter colors of the color filter pattern CF1, the color filter pattern CF2, and the color filter pattern CF3 are, for example, red, green, and blue respectively.

Since the foreign matter CP in the first abnormal area ABA1 is located in a display pixel provided with the color filter pattern CF1, when the display panel DP operates at the L0 gray level, existence of the foreign matter CP may cause poor alignment of liquid crystal molecules overlapped with the color filter pattern CF1 in the liquid crystal layer LCL, resulting in light leakage. Therefore, when the display panel DP switches between the L0 gray level and the L3 gray level, a brightness change amount of display pixels of light leakage may be significantly smaller than its brightness at the L3 gray level (i.e., a brightness change rate will be smaller).

On the other hand, in the defect determination results of the first M abnormal areas, the defect in the third abnormal area ABA3 is determined not to be an in-panel defect. As shown in FIG. 6, since the defect in the third abnormal area ABA3 is caused, for example, by debris DB (or falling dust) attached to a surface of the substrate SUB2, the arrangement of the liquid crystal molecules in the liquid crystal layer LCL is not affected by the debris DB. Therefore, the brightness change rate produced by the display panel DP switching between the L0 gray level and the L3 gray level may be larger.

Referring to FIG. 1 and FIG. 3 at the same time, after completing the defect determination of the first M abnormal areas, the analysis unit 200 may decide whether to continue defect determination of an (M+1)-th abnormal area to a 2M-th abnormal area (i.e. M abnormal areas of a next round), or the (M+1)-th abnormal area to an N-th abnormal area in the sorted N abnormal areas based on whether there is an abnormal area without an in-panel defect in the first M abnormal areas (step S104).

For example, in the embodiment, in the defect inspection results of the first M (for example, three) abnormal areas, the defect in the third abnormal area ABA3 is not determined as an in-panel defect. Namely, there is an abnormal area without the in-panel defect in the first M abnormal areas, so that the analysis unit 200 may stop defect inspection of the remaining abnormal areas (i.e., the (M+1)-th abnormal area to the N-th abnormal area) in the sorted N abnormal areas.

If the defects in the first three abnormal areas are all determined to be in-panel defects, the analysis unit 200 may continue to perform defect determination (i.e. the next round of determination) of a fourth to sixth abnormal areas (or the N-th abnormal area) in the sorted N abnormal areas. If N is greater than 9, the analysis unit 200 may determine whether to proceed with defect determination of a third round of M abnormal areas (i.e., a (2M+1)-th abnormal area to a 3M-th abnormal area) according to the determination results of the M abnormal areas of the second round by using the above determination logic (i.e. step S104). Deduced by analogy, the defect inspection is not stopped until one of the M abnormal areas in a certain round is determined to have no in-panel defect or all of the N abnormal areas are determined.

By now, determination of in-panel defects existing in a single color (for example, red) of pixels of the display panel DP is completed. Then, determination of in-panel defects of another color (for example, green or blue) of pixels of the display panel DP may be performed according to the above steps S102 to S104. For detailed instructions, reference may be made to the relevant paragraphs mentioned above and details thereof are not repeated. The following only describes differences in the inspection process of the in-panel defects that exist in different colors of pixels.

In the inspection process of in-panel defects in green pixels, the analysis unit 200 determines an abnormal area according to the first green image (i.e. the image captured by the imaging unit 100 through the filter 132 when the display panel DP operates at the L0 gray level) in step S102, and selects the first M abnormal areas based on a brightness ratio corresponding to each abnormal area in the first green image and the first red image (i.e. the image captured by the imaging unit 100 through the filter 131 when the display panel DP operates at the L0 gray level) in step S103, and determines the in-panel defects according to the first green image and the second green image (i.e. the image captured by the imaging unit 100 through the filter 132 when the display panel DP operates at the L3 gray level) in step S104.

Similarly, in the inspection process of in-panel defects in blue pixels, the analysis unit 200 determines an abnormal area according to the first blue image (i.e. the image captured by the imaging unit 100 through the filter 133 when the display panel DP operates at the L0 gray level) in step S102, and selects the first M abnormal areas based on a brightness ratio corresponding to each abnormal area in the first blue image and the first green image (i.e. the image captured by the imaging unit 100 through the filter 132 when the display panel DP operates at the L0 gray level) in step S103, and determines the in-panel defects according to the first blue image and the second blue image (i.e. the image captured by the imaging unit 100 through the filter 133 when the display panel DP operates at the L3 gray level) in step S104.

After the in-panel defects in each color (for example, red, green, and blue) of pixels of the display panel DP are determined by the aforementioned steps and logic, inspection of the in-panel defects of the display panel DP is completed.

It should be noted that the judgment logic of the aforementioned steps S102 to S104 may not only reduce an inspection time of defects, but may also significantly reduce the number of false inspection of the defects. In other words, the defect inspection system 10 may effectively improve a recognition rate of the in-panel defects (as shown in FIG. 5).

Referring to FIG. 1, FIG. 7 and FIG. 8, in the embodiment, the defect inspection system 10 may also be used to inspect color defects (for example, color mura) of a display panel DP-A. The process of color defect inspection performed on the display panel DP-A by the defect inspection system 10 is exemplarily described below.

First, a plurality of monochrome images of the display panel DP-A operating at a gray level are captured through a plurality of filters (i.e., step S201). For example, when the display panel DP-A operates at the L0 gray level, the imaging unit 100 may capture a red image, a green image and a blue image of the display panel DP-A through the filter 131, the filter 132 and the filter 133.

After completing capture of the plurality of monochrome images, the analysis unit 200 may determine whether the display panel DP-A has a color defect based on whether a brightness ratio of any two of these monochrome images in the abnormal area ABA is greater than a setting value (i.e., step S202). For example, the red image and the blue image respectively have two brightnesses corresponding to the abnormal area ABA, and a ratio of the two brightnesses (for example, a ratio of red brightness to blue brightness) is greater than the setting value. Accordingly, the analysis unit 200 determines that there is a color defect in the abnormal area ABA of the display panel DP-A. However, the disclosure is not limited thereto. In other embodiments, the brightness ratio used to determine whether there is a color defect may also include a ratio of green brightness to red brightness or a ratio of blue brightness to green brightness.

By now, determination of color defects in the display panel DP-A is completed.

It should be noted that through the above-mentioned judgment logic of brightness ratio of different monochrome images in the abnormal area, even color defects with similar gray levels may still be detected by the defect inspection system 10 of the embodiment.

Another embodiment is provided below to describe the disclosure in detail, in which the same components are denoted by the same symbols, and description of the same technical content will be omitted. Please refer to the aforementioned embodiments for the omitted parts, which will not be repeated below.

Figure 9:
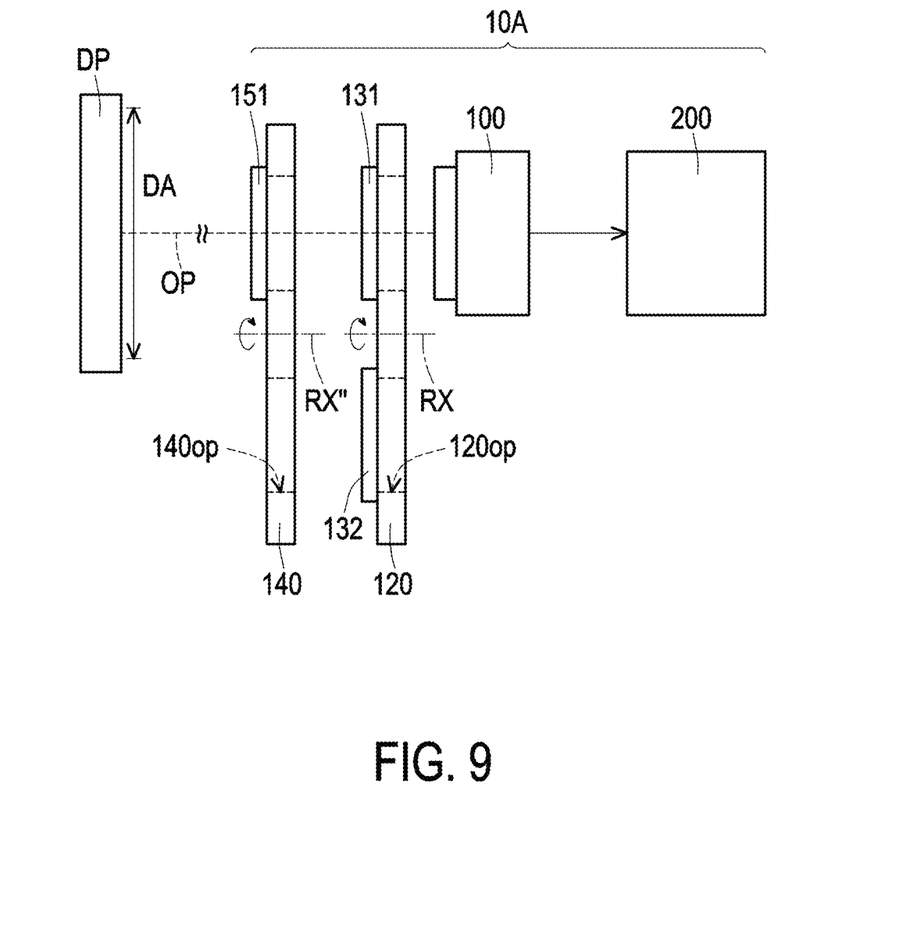
FIG. 9 is a schematic side view of a defect inspection system according to another embodiment of the disclosure.
Figure 10:
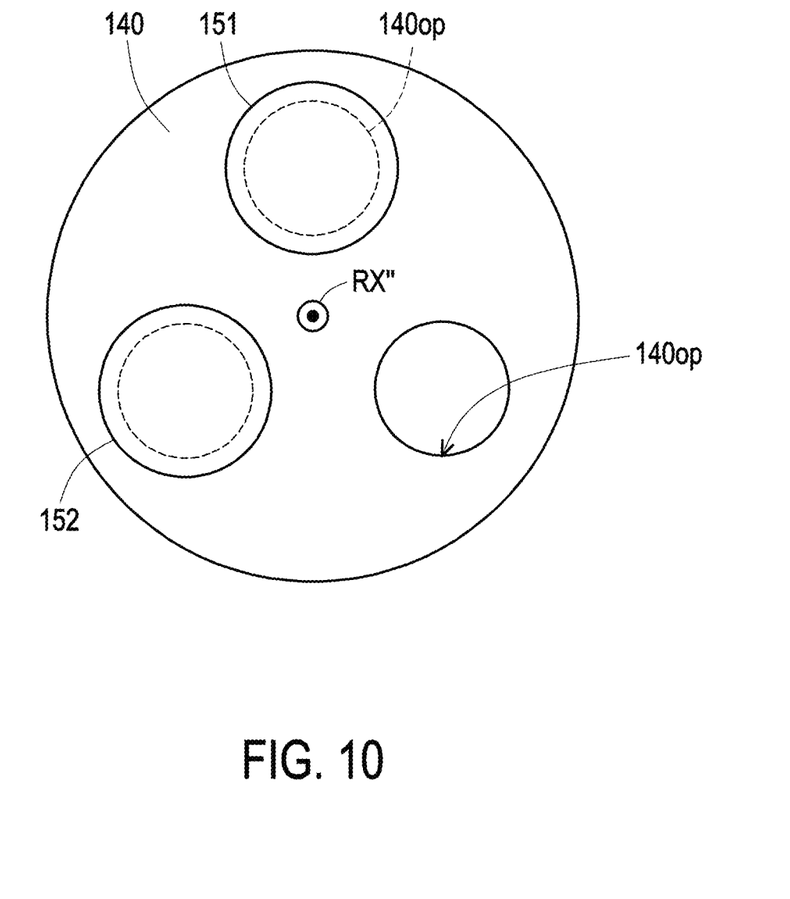
FIG. 10 is a schematic front view of a plurality of dimming elements set on a switching mechanism in FIG. 9.

FIG. 9 is a schematic side view of a defect inspection system according to another embodiment of the disclosure. FIG. 10 is a schematic front view of a plurality of dimming elements set on a switching mechanism in FIG. 9. Referring to FIG. 9 and FIG. 10, compared to the defect inspection system 10 of FIG. 1, a defect inspection system 10A of the embodiment may further include a dimming element 151 and a dimming element 152 having light transmittances different from each other. For example, when the imaging unit 100 captures at least one of a plurality of monochrome images of the display panel DP, the dimming element 151 or the dimming element 152 may be disposed on the imaging optical path OP of the imaging unit 100.

In the embodiment, these dimming elements may be disposed on the switching mechanism 140. The switching mechanism 140 is, for example, a turntable, but the disclosure is not limited thereto. The switching mechanism 140 may be provided with three openings 140op, and two of the openings 140op are respectively provided with the dimming elements 151 and 152 in overlap. For example, when an intensity of light (not shown) from the display panel DP is too high, the dimming element 151 (or the dimming element 152) may be used to reduce the light intensity. If, in the subsequent image capturing process, the intensity of light from the display panel DP is moderate, the turntable serving as the switching mechanism 140 may rotate clockwise or counterclockwise relative to a rotation axis RX", so that the dimming element 151 located on the imaging optical path OP of the imaging unit 100 is switched to the opening 140op without a dimming element.

In summary, in the defect inspection system according to an embodiment of the disclosure, the analysis unit determines the type of defect of the display panel in the abnormal area according to the brightness ratio or the brightness change rate between two gray levels of two of the monochrome images in the plurality of monochrome images captured by the imaging unit corresponding to the abnormal area of the display panel. Since the imaging unit captures these monochrome images of the display panel operating in at least one gray level image through multiple filters of different filter colors, recognition rate of the defect inspection system on different types of defects is greatly improved.

What is claimed is:

1. A defect inspection system, comprising:
    an imaging unit, adapted to capture a plurality of monochrome images of at least one gray level image of a display panel through a plurality of filters, wherein filter colors of the filters differ from each other; and
    an analysis unit, adapted to determine a type of defect of the display panel in an abnormal area according to a brightness ratio or a brightness change rate between two gray levels of two of the monochrome images corresponding to the abnormal area of the display panel, wherein the filters are disposed on a switching mechanism, before the imaging unit captures at least one of the monochrome images of the display panel, the switching mechanism is adapted to switch one of the filters on an imaging optical path of the imaging unit to another one of the filters.

2. The defect inspection system as claimed in claim 1, wherein the filters comprise a first filter and a second filter, and the imaging unit is adapted to respectively capture a first monochrome image and a second monochrome image of the display panel operating at a first gray level and a second gray level through the first filter, and respectively capture a third monochrome image and a fourth monochrome image of the display panel operating at the first gray level and the second gray level through the second filter, wherein a level of the second gray level is higher than a level of the first gray level, and the first gray level is an L0 gray level.

3. The defect inspection system as claimed in claim 2, wherein when a brightness of the first monochrome image corresponding to a local area of the display panel is greater than a setting value, the local area is determined to be the abnormal area.

4. The defect inspection system as claimed in claim 3, wherein the first monochrome image has a first brightness corresponding to the abnormal area, the second monochrome image has a second brightness corresponding to the abnormal area, the third monochrome image has a third brightness corresponding to the abnormal area, and when a ratio of the first brightness to the third brightness is greater than a first setting value, a percentage of an absolute difference between the second brightness and the first brightness to the first brightness is within a first numerical range and the first brightness is within a second numerical range, there is an in-panel defect in the abnormal area.

5. The defect inspection system as claimed in claim 4, wherein the filter colors of the first filter and the second filter are respectively red and blue, green and red, or blue and green.

6. The defect inspection system as claimed in claim 4, wherein the display panel is determined to have N abnormal areas, the N abnormal areas are sorted from large to small according to a brightness of the first monochrome image corresponding to each of the N abnormal areas of the display panel, a first abnormal area to an M-th abnormal area are selected from the sorted N abnormal areas to perform defect type determination, where M is less than N, and when at least one of the first abnormal area to the M-th abnormal area is determined not to have the in-panel defect, after completing the defect type determination of the first abnormal area to the M-th abnormal area, defect inspection is stopped.

7. The defect inspection system as claimed in claim 1, wherein the filters comprise a first filter and a second filter, the imaging unit is adapted to capture a first monochrome image of the display panel operating at a gray level through the first filter, and capture a second monochrome image of the display panel operating at the gray level through the second filter.

8. The defect inspection system as claimed in claim 7, wherein the first monochrome image has a first brightness corresponding to the abnormal area, the second monochrome image has a second brightness corresponding to the abnormal area, and when a ratio of the first brightness to the second brightness is greater than a setting value, there is a color defect in the abnormal area.

9. The defect inspection system as claimed in claim 1, further comprising a plurality of dimming elements having light transmittances different from each other, wherein during a process of the imaging unit capturing at least one of the monochrome images, an imaging optical path of the imaging unit is provided with one of the dimming elements.

* * * * *